Dec. 11, 1956 J. S. WOLFE 2,773,415

METHOD AND APPARATUS FOR QUANTITATIVE SPECTRAL ANALYSIS

Filed Jan. 26, 1955 7 Sheets-Sheet 1

INVENTOR.
John Sohn Wolfe
BY John D. Marvin
HIS ATTORNEY

Dec. 11, 1956 J. S. WOLFE 2,773,415

METHOD AND APPARATUS FOR QUANTITATIVE SPECTRAL ANALYSIS

Filed Jan. 26, 1955 7 Sheets-Sheet 2

INVENTOR.
John Sohn Wolfe
BY
HIS ATTORNEY

| Col. 1<br>IRON % | Col. 2<br>3060 AL LINE | Col. 3<br>FE LINE | Col. 4<br>READING USING BOTH SCALES | Col. 5<br>READING USING 3060 SCALE |
|---|---|---|---|---|
| .05 | 27 | 75 | 14 | 11 |
| .13 | 37 | 43 | 46 | 45 |
| .30 | 34 | 12 | 76 | 79.5 |

INVENTOR.
John Sohn Wolfe
BY John T. Marvin
HIS ATTORNEY

Dec. 11, 1956 J. S. WOLFE 2,773,415

METHOD AND APPARATUS FOR QUANTITATIVE SPECTRAL ANALYSIS

Filed Jan. 26, 1955 7 Sheets-Sheet 4

INVENTOR.
John Sohn Wolfe
BY
John T. Main
HIS ATTORNEY

METHOD AND APPARATUS FOR QUANTITATIVE SPECTRAL ANALYSIS

Filed Jan. 26, 1955 7 Sheets-Sheet 5

INVENTOR.
John Sohn Wolfe
BY
John T. Mann
HIS ATTORNEY

Dec. 11, 1956 J. S. WOLFE 2,773,415

METHOD AND APPARATUS FOR QUANTITATIVE SPECTRAL ANALYSIS

Filed Jan. 26, 1955 7 Sheets-Sheet 6

INVENTOR.
John Sohn Wolfe
BY
John T. Mannin
HIS ATTORNEY

INVENTOR.
John Sohn Wolfe
BY
John T. Marvin
HIS ATTORNEY

United States Patent Office 2,773,415

Patented Dec. 11, 1956

2,773,415

METHOD AND APPARATUS FOR QUANTITATIVE SPECTRAL ANALYSIS

John Sohn Wolfe, Dayton, Ohio, assignor to General Motors Corporation, Detroit, Mich., a corporation of Delaware Application January 26, 1955, Serial No. 484,263

16 Claims. (Cl. 88—14)

This invention relates to spectro analysis and more particularly to the quantitative analysis of materials by emission spectroscopy.

Light, whether visible or invisible, may be dispersed into various wave lengths or monochromatic components by refraction through a prism or by a difraction grating. An alloy or other mixture of elements may be converted into incandescent vapors by electrical means as by a spark or arc which will emit light. The monochromatic components of this light are characteristic of the types or species of atoms present in the alloy or mixture of materials and their intensity is theoretically proportional to the concentration of the elements.

An alloy or mixture of elements to be quantitatively analyzed, as above indicated, may be converted into an incandescent vapor emitting radiations which may be spread out by a dispersing device such as a spectrograph into lines, each line being an image of a slit through which the radiations enter the instrument. The radiations may be progressively reduced in intensity by a known ratio as by a step sector or calibrated filter so that the lines vary along their lengths according to a known intensity ratio. These lines or monochromatic components of varying intensity may be photographed on a photographic plate or measured by other methods such as photocells or photomultiplier tube devices.

When a photographic emulsion is prepared in the dark and exposed to radiation containing wave lengths to which it is sensitive, a latent image is formed which can be made visible by development. The degree of blackening on a given spot on a photographic emulsion may be expressed in terms of its density which may be determined by sending a beam of light through the image with a densitometer and measuring the fraction of light that emerges on the opposite side. The ratio of the transmitted light to the incident light is called the transmission T expressed for this purpose as a fraction of unity, rather than as a percentage, of the image. The reciprocal of transmission is called the opacity O. The density is the logarithm of opacity to the base 10; thus, $$d = \log_{10} O = \log_{10} \frac{1}{T}$$

A spot which transmits $\frac{1}{10}$ of the light sent through it has a transmission of $\frac{1}{10}$ or 10 percent, an opacity of 10 and a density of 1.

The response of a photographic emulsion to a light beam depends on the intensity $i$ of the light, its wave length, the time and conditions of exposure, the conditions of development of the plate and many other minor factors. In monochromatic photometry only the intensity of the light being measured and the density $d$ or percent transmission, which is a measure of this intensity, are essential. Accordingly, the various factors effecting the emulsion may be controlled or maintained essentially constant to provide a reliable method of measurement.

A fundamental axiom of photographic photometry is that if two light beams of the same wave length produce equal intensities on a given plate at the same time of exposure, they are equal in intensity. When two beams of unequal intensity are to be compared, one need only to determine the ratio by which the stronger beam must be reduced in intensity to make its density equal to that produced by the weaker beam.

With equality of intensity, the emulsion may be used as a measuring means. Under controlled conditions it may be determined how density varies with intensity. Then an unknown intensity can be interpolated between two known values of intensity, by interpolating the density that the intensity produces on the curve expressing the $d$ log $i$ relation which may thus be regarded as a calibration curve. The density may be plotted against the common logarithm of the intensity producing it to form a curve of relatively simple shape covering a wide range of intensities which is known as a "gamma" or "H and D" curve. The other functions of the blackening of the plate and the light intensity could be plotted against one another if the use of such function is desirable for purposes of computation. Since the quantity that is usually read directly is a galvanometer or microammeter deflection of a densitometer generally calibrated to read directly in percent transmission of the image, it is convenient to plot this deflection directly on double logarithm paper so that a curve of $d$ against $\log_{10} i$ results which is convenient and practical for calibration purposes either in such form or by projection on the intensity axis to constitute a mathematically equivalent scale.

In the selection of lines for quantitative analysis, it is conventional practice to use two spectrum lines for the concentration determination of a given element. One of these lines is the line of the element itself, chosen to give the necessary and, if possible, uniform, concentrational sensitivity so that the working curve will be a nearly straight line with a 45° slope when the coordinate parameters of the paper are in a 1:1 ratio. The second line is selected to lie as close in the spectrum to the first as possible to simplify photographic problems, and similar in intensity to the first to simplify the comparison of intensities. It may be a line of an element of the matrix material, of some impurity known to be present in the alloys to be analyzed in constant amounts, or of an element especially added in constant amounts to furnish a spectrum line whose intensity is as nearly constant as possible in all exposures and is known as an internal standard line. Furthermore, it is highly important that the compared lines represent approximately equivalent energy transisions of their respective atomic sources, so that minor variations in the electrical characteristics of the arc or spark will not excessively distort their intensity ratio.

In the earlier techniques of computation, attempts were made to obtain analysis directly by measurement of the element line only, using the gamma curve to convert the transmission of a line to a log intensity value. Due to difficulties in obtaining exactly reproducible conditions of excitation, this method had to be abandoned, to be supplanted by a method using the gamma curve to obtain the log intensities of both the element line and the internal standard line. From these values the ratio of the two lines is obtained, and by running several samples of known composition covering a required range of values a curve known as a working curve is constructed which correlates the ratio of intensities to the percent of the element in a given sample. This working curve may be projected on its log intensity axis to construct a scale which is commonly called a working scale.

The two items, curve and scale, differ in form, but have identical mathematical significance.

It is an object of this invention to provide an improved method of measuring the relative intensities of two spectrum lines with a resultant increased accuracy of comparison and a relaxation of the restriction that compared lines must be of similar wave lengths.

It is another object of this invention to provide a method of spectroscopic analysis wherein a separate gamma curve or scale derived therefrom is used for the measurement of the intensity of each spectrum line of different wave lengths which are compared.

It is yet another object of this invention to obtain the intensity of the line of an element present in unknown concentration and establish its ratio by comparison with an intensity which is derived by computation of the intensities and ratio of two lines of an internal standard element.

It is a further object of this invention to provide a device incorporating scales derived from gamma curves established experimentally as being correct for each spectrum line individually and using these scales in combination with each other and with a linearly calibrated scale to obtain directly a number bearing a linear relationship to the log intensity ratio of the intensities.

Still a further object of this invention is to provide a means of generating working curves or scales derived therefrom which are physically and mathematically independent of the apparatus used to derive them.

A method of analysis in accordance with the above objects offers many advantages over present methods of analysis. It permits the choice of lines for comparison without regard to their wave length difference. Errors resulting from comparing lines of widely different intensities are substantially reduced. It increases the number of lines available for analytical purposes and improves the homologousness of the line groups used. It eliminates the measurement of gamma as such without loss of accuracy. It compensates for small variations in the source of radiation and in photographic processing. It permits the use of working curves over wider ranges because each curve is referrent only to an arbitrary intensity level. It reduces the number of working curves needed. Further, the computing device of this invention requires no more time than conventional devices on single element analysis and less time if several elements are being analyzed.

Further objects and advantages of this invention will be apparent from the following description, reference being had to the accompanying drawings wherein a preferred embodiment of the present invention is clearly shown.

In general, the method of analysis of this invention consists of the following steps: an alloy or mixture of the material to be analyzed is caused to emit light and a spectrum is produced. A portion of the spectrum including at least two lines, one of which represents the unknown and the other of which represents at least one line of an internal standard, is recorded. On the same or a similar plate or film are provided calibration exposures using a step sector, neutral filter or other calibrating device to obtain data for construction of separate gamma curves valid at each of the two or more wave lengths of the lines to be compared. After developing the plate, the percent light transmission through the various portions of the lines corresponding to the time exposure graduations is measured by a densitometer or other suitable device and curves are plotted relating percent light transmission to log intensity. The curves are then projected on their respective intensity axes to obtain independent scales of a logarithmic nature by which the ratio of any value on one curve may be determined to any value of the other curve. Spectra are then produced for a series of standard samples containing the element to be analyzed in known amounts and a portion containing the unknown and the internal standard lines are recorded on a photographic plate. The percent light transmission values for both said lines of each sample is determined and using the above mentioned independent logarithmic scales a ratio is set up of the intensity of the unknown line to the standard line. A working curve is then plotted relating the percent concentration of the unknown and the said ratio and an equivalent scale constructed. Unknown samples may then be analyzed by merely determining light transmission values for the unknown and internal standard lines, setting up their ratio and reading the percent concentration of the unknown from the working curve.

After the working scale has been constructed, it is placed upon a fan scale background and, in subsequent use, exposures are made of two or more standards to determine the log intensity ratio numbers derived by use of the gamma scales above described. The working scale is then shifted upon the fan grid until the concentration values on the scale correspond with the respective log intensity ratio numbers on the fan grid as determined on the respective standards. This operation calibrates the scale to afford compensation for day to day variations in excitation and photographic conditions.

The log intensity number for the unknown is computed in the same manner as for the sample and the concentration on the working curve which is opposite to that number is the element percentage present in the unknown.

As above indicated, the ratio of the unknown and internal standard lines are set up using independent logarithmically plotted scales which are derived from gamma curve plots which will be hereinafter fully described.

Figure 1:
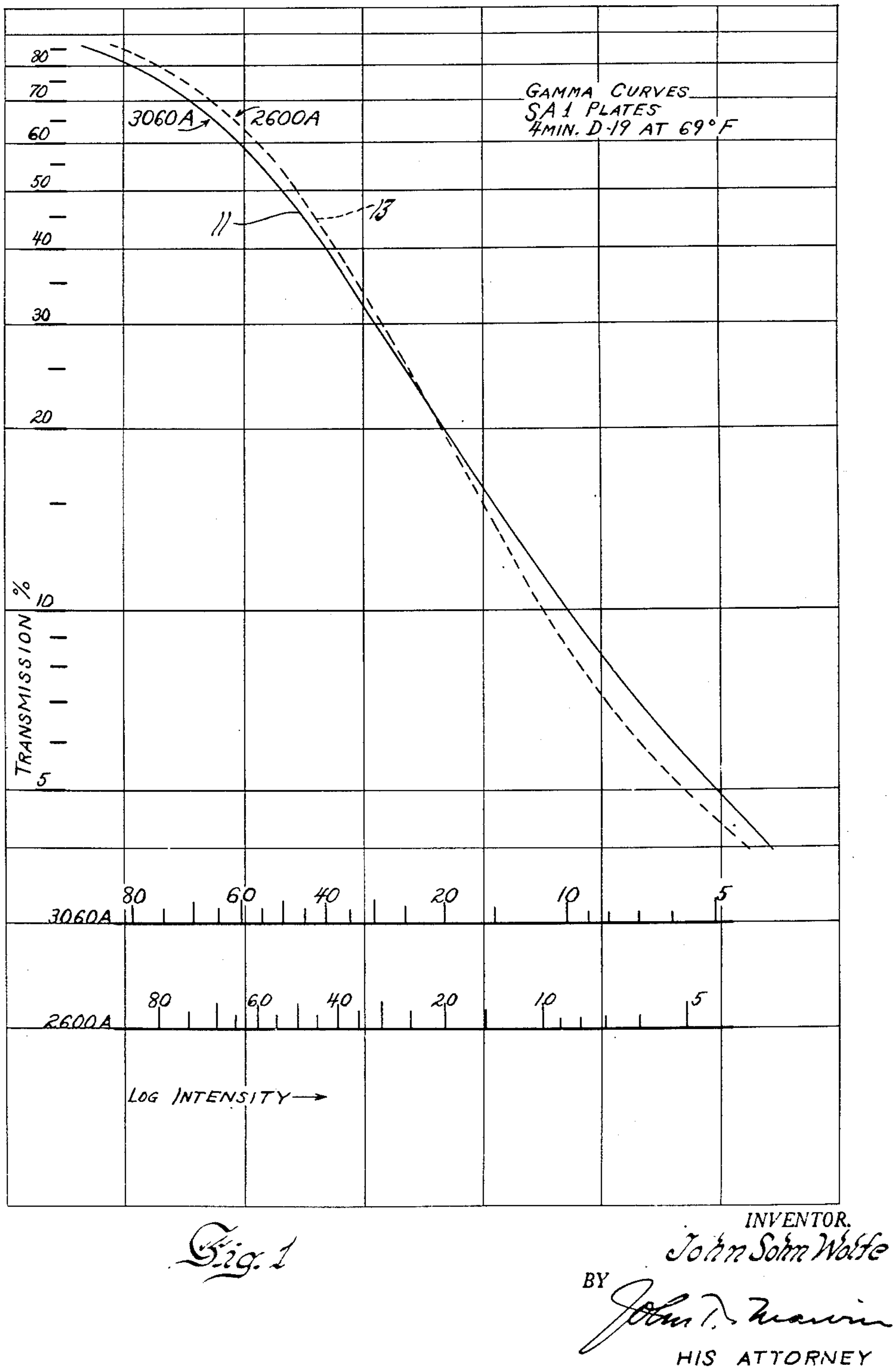
Fig. 1 is a plot showing gamma or H and D curves for radiations of different wave lengths, and the conversion of these curves into scales for the computer.

Referring now to the drawings, the invention will now be described in greater detail in terms of an example wherein aluminum is a predominant constituent and is employed as an internal standard element and iron is present in relatively small quantities and represents the unknown. Although the invention is described in terms of specific alloys, it is obvious that it may be applied with obvious modifications to the analysis of any alloy or mixture of materials. Fig. 1 shows a gamma curve 11 plotted for the aluminum line having wave length of 3060 A. as a solid line and a gamma curve 13 plotted for the iron line having a wave length of about 2600 A. as a broken line. The curves are plotted on log paper and relate percent transmission and log intensity value. It will be understood that other functions of intensities may be employed but the percent transmission function and the coordinate scales indicated are chosen as most convenient. The values of intensity and percent transmission are obtained by using any method and apparatus well known known in the art, for example, as shown in U. S. Patents 1,979,964 and 2,043,-053.

Figure 2:
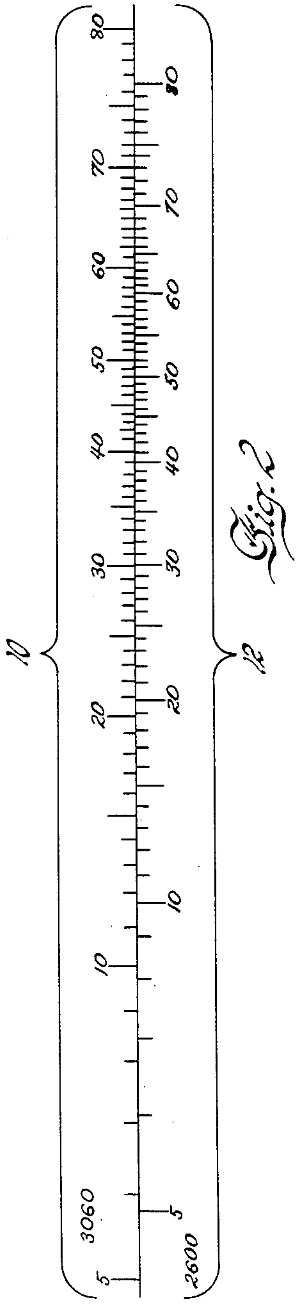
Fig. 2 is a comparison of intensity scales derived from the gamma curves shown in Fig. 1.

The gamma curves 11 and 13 are projected on their intensity axes to derive scales of a logarithmic nature which when set side by side may be compared as scales 10 and 12 shown in Fig. 2. Each of these scales is different from and independent of the other. However, each scale is identical in that equal distances on each scale correspond to energy ratio changes of identical magnitude over their entire lengths. Any given linear distance along said scales from a reference point represents the same change in energy or intensity. Accordingly, these scales may be placed on relatively movable members in a manner similar to scales on a conventional slide rule to form a simplified version of the computing device of this invention as is shown in Fig. 3.

The scale 10 relating to the internal standard line is placed on one relatively movable member 14 while the scale 12 relating to the unknown line is placed on the other relatively movable member 16. A scale 18 calibrated in equal, constant arguments is disposed in stationary relationship to scale 10 but movable relative to scale 12. A marker or index 20 is disposed opposite an arbitrarily selected value on the linear scale 18. The scales 10 and 12 are arranged to have a value 30 coincide which establishes an index at which the two scales have identical numerical values and from which they have identical linear distances along the scales relative to the arbitrarily selected index point 50 midway along the linear scale 18 opposite the index marker 20. The point to which scales 10 and 12 coincide is dependent on the selection of intensity axes for the gamma curves, Fig. 1. The fact that the curves on Fig. 1 intersect in the drawing is not revelant to the selection of the arbitrary index, which is selected purely for convenience. It is readily seen that if it is desired to obtain a relative energy ratio of any value on scale 12 to any value on scale 10, the members 14 and 16 are moved relative to each other until said values coincide and the value on the linear scale 18 which coincides with marker 20 gives the energy ratio. This operation from a mathematical standpoint involves subtracting the log of a given intensity value of scale 12 from the log of a given intensity on scale 10 and expressing the difference in terms of arbitrary units on linear scale 18 as a ratio. It should be noted that this operation is concerned with the change in the intensity ratio from its index value rather than with the absolute ratio of the intensities involved.

Figure 3:
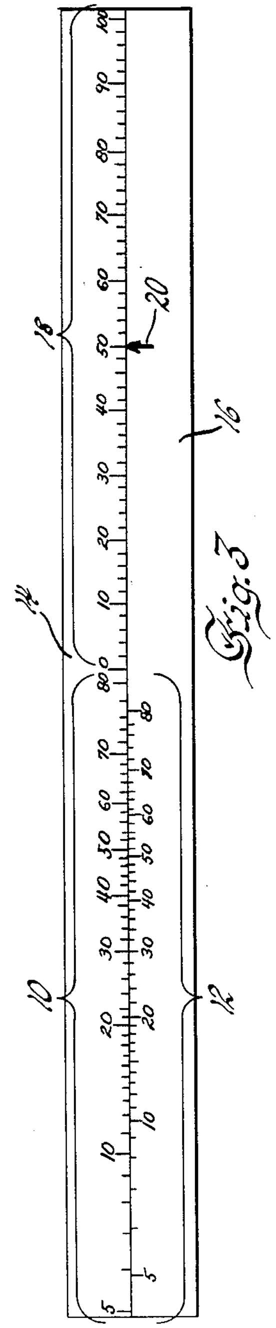
Fig. 3 is one form of apparatus which may be used to practice one innovation embodied in the present invention.
Figure 4:
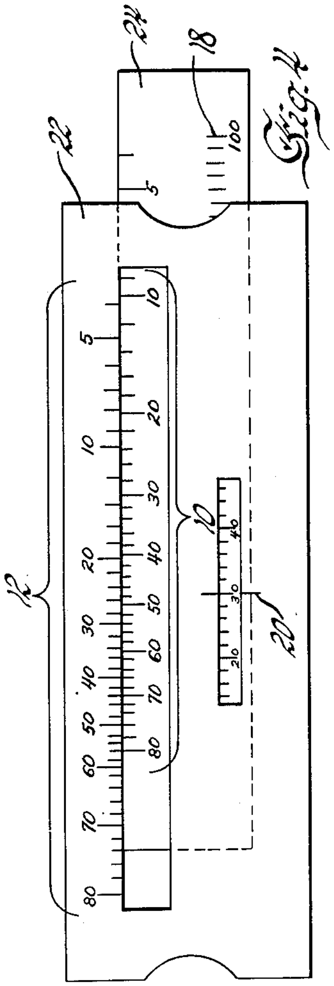
Fig. 4 is another embodiment of the apparatus shown in Fig. 3.

Fig. 4 shows another embodiment of the computing device shown in Fig. 3 consisting of a stationary member 22 carrying scale 12 and marker 20 and a relatively movable member 24 carrying scales 10 and 18. The operation of this embodiment is easily understood in relation to the discussion of the embodiment of Fig. 3. It is apparent that the linear scale may be attached to either calibration scale simply by reversing the sequence of its numbering.

Figures 5, 6:
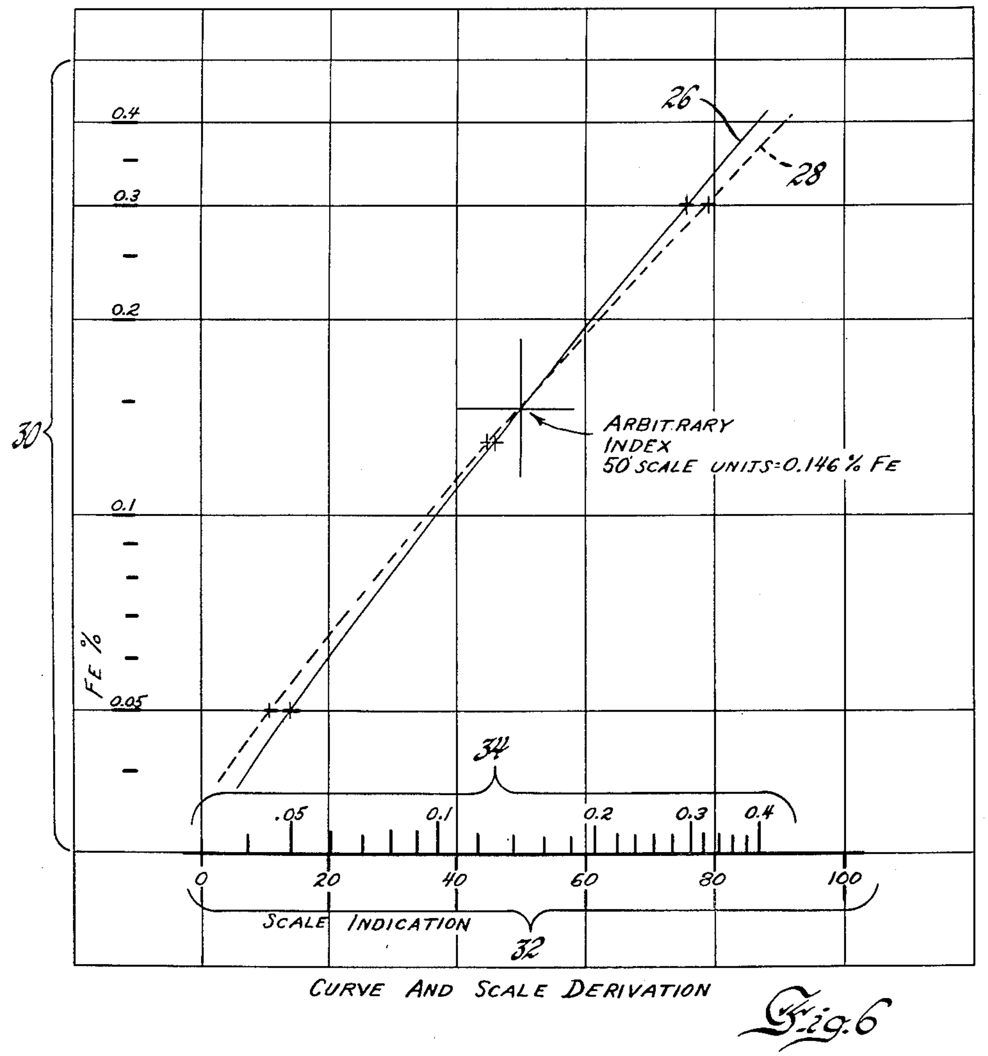
Fig. 5 is an example of a tabulation of values used in carrying out the invention.
Fig. 6 is a working curve plotted from values shown in Fig. 5, showing the derivation of a working scale.

After constructing a computing device as shown in Fig. 3 several standard samples are selected containing the unknown element in known but varying amounts. A sample is caused to emit light as is well known in the art, a spectrum is made, and a photographic plate is exposed to the portion of the spectrum containing the unknown and the internal standard lines for a suitable time. After developing the plate the percent transmission of light through the developed image of each line is determined with a densitometer or other suitable device as is well known in the art. This determination is made for each sample. Next, the intensity value of the unknown line is computed as a ratio to the aluminum or internal standard line using the computing device illustrated in Figs. 3 and 4 as above described. It is to be noted that the percent transmission values as directly read from the densitometer may be used directly in this computation because the scales of the computer are derived from gamma curves and thus automatically and precisely convert percent transmission values to log intensity values. This computing principle differs significantly from prior art in that no previous methods embody the simultaneous use of two or more different calibration scales. Fig. 5 shows a tabulation for three samples containing .05, .13, and .30 percent iron, respectively. Columns 2 and 3 indicate the respective aluminum and iron line percent transmission values as read from a densitometer. Column 4 gives a ratio of the iron line intensity to the aluminum line intensity as computed by the devices shown in Figs. 3 and 4. Column 5 shows, for comparison purposes, the ratios if the computer shown in Fig. 3 used identical scales; that is, scales based on the internal standard line alone which in effect is the conventional practice of the prior art.

A working curve 26, Fig. 6, is next plotted on semi-log paper relating the percent composition values of column 1 as the ordinate 30 to the intensity or energy ratios of column 4 as the abscissa 32. The curve 28 shown as a broken line indicates the distorted curve resulting from a plot of the percent composition values of column 1 against the ratios of column 5 which is conventionally used in the prior art. The working curve 26 may be projected on the abscissa in terms of the percent composition to form scale 34 adjacent energy ratio scale 32 for convenience. It should be noted that the manner of the use of working curve scales in this method is a distinct departure from prior art in that provision is made to permit a complete disassociation of the scale from its background, rather than a very limited partial disassociation or mathematical equivalent thereof, as heretofore. It should also be noted that the preceding steps depart from prior art in that they afford a means of constructing a working curve which is mathematically a function of intensity ratio only, instead of, as heretofore, a function of both intensity ratio plus deviations due to dissimilarity in the true gamma curves of the compared lines.

Having developed the working curve, in order to run an analysis on an unknown sample, it is only necessary to repeat the procedure applied to the standard to obtain an energy ratio and read the percent concentration of the unknown directly from the working curve of Fig. 6.

Figure 7:
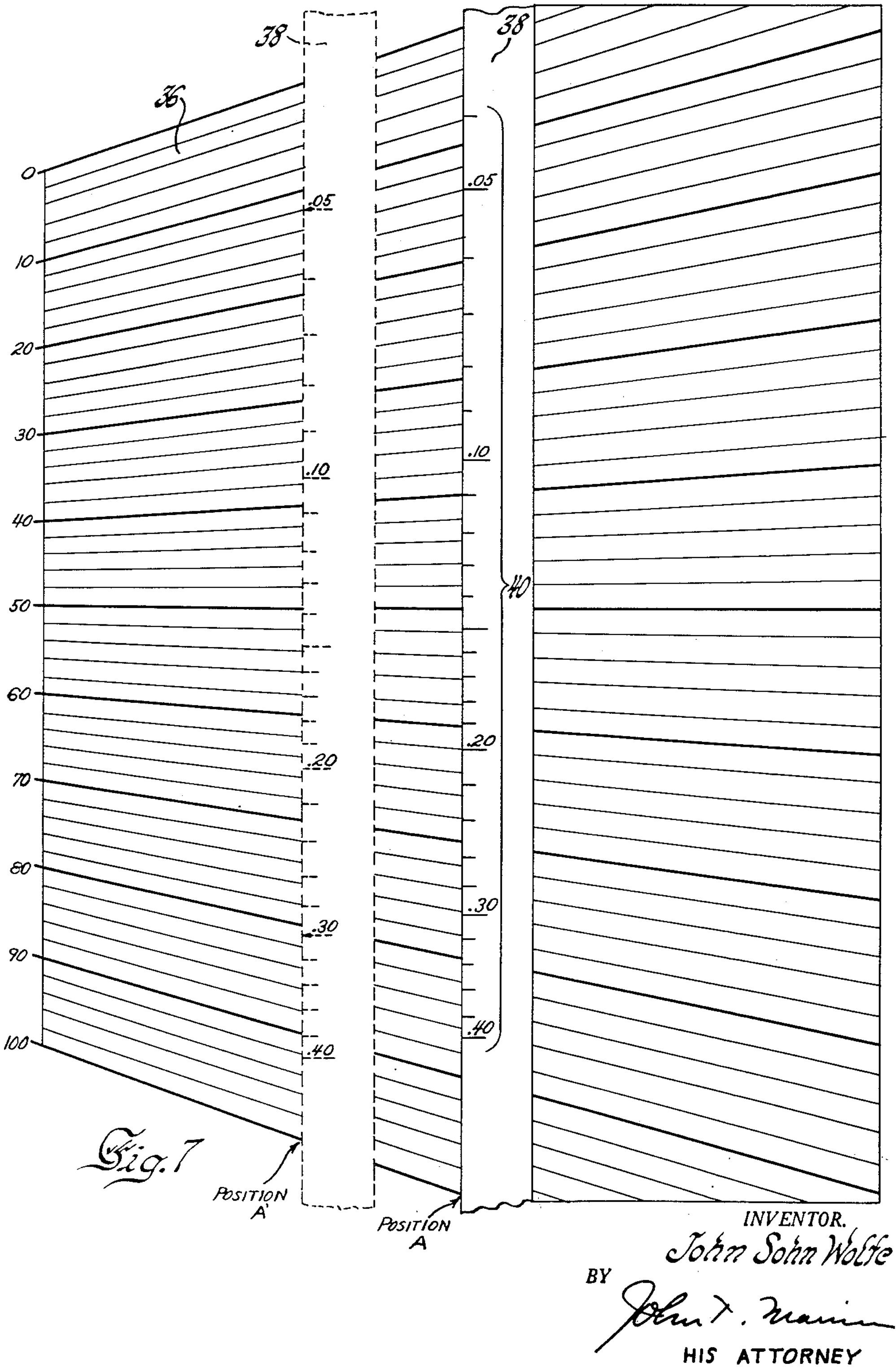
Fig. 7 is a working scale applied to a fan background for use with devices shown in Figs. 3 and 4 and the data in Fig. 6.

One of the advantages of the present method of analysis is that the working scale shown in Fig. 7 is valid for all alloys containing iron in small amounts irrespective of the internal standard present in the alloy. Thus, although the curve 26 was developed using aluminum as an internal standard, the scale would be equally valid if the internal standard was, for example, nickel, cobalt, or magnesium. This constitutes a departure from prior art in that working curves derived on other types of computers are completely restricted and applicable only when the exact conditions of their derivation are duplicated.

When the method of this invention is used on a day to day basis the working curve of Fig. 6 may shift each day due to changes in photographic conditions. This shift may be considered to take the form of an elongation or compression of the gamma scales, or as a similar distortion of the curve 26. This premise departs from prior art in making the assumption that for small photographic variables, the relative lengths of the gamma scales are not changed, even though the absolute lengths may vary. However, the character of the working curve remains essentially constant. It will be noted that a compression or elongation of curve 26 will result in compressive or elongative distortion of scales 32 and 34. To compensate for these changes, scales 32 and 34 may be set up as shown in Fig. 7. Scale 32 is next modified into the form of a fan grid 36. Scale 34 is mounted on a vertically disposed movable member 38 to form scale 40. To calibrate the working curve 36 each day to compensate for the aforementioned shifts, it is only necessary to run two standard samples having the unknown varied so as to cover generally opposite ends of scale 40 of Fig. 7. The energy ratios are determined as previously indicated. Scale 40 is then moved right or left as is necessary for the percent composition lines to coincide with their respective corresponding energy ratios on the fan scale 36. Referring to Fig. 7, if, for example, it was found that two standard runs resulted in samples having .05 percent iron and .30 percent iron giving energy ratio numbers of 11 and 81 respectively, movable scale 40 would be shifted to the left from its previous days position A to position A′ so that the .05 percent iron line would coincide or would correspond to an energy ratio of 11 and the .30 percent iron to an energy ratio of 81 as shown. This process departs from prior art which requires two separate calibration processes to attain, respectively, the shifts signified, respectively, by vertical and horizontal movements of the working scale relative to the fan grid.

Other devices could, of course, be used. For instance, the working curve scales could be drawn directly on rubber or other easily distortible material or device, as a spring, and mounted so that they could be stretched or compressed to any degree desired and/or moved up or down on the movable slide.

The method of this invention has been above described in terms of setting up a working curve wherein the concentration of an unknown element is related to the ratio and magnitude of the intensity of two lines, one of the lines being the unknown and the other being an internal standard. In conventional procedure of the prior art, a working curve is also set up wherein the concentration of the unknown element is related to the ratio of the intensity of the "element line" to the intensity of the internal standard line. However, in the prior art, the working curve is set up based on the assumption that a single gamma curve or scale, generally the internal standard but not necessarily derived therefrom, may be selected which will represent accurately the response function of a photographic emulsion to different wave lengths, which is only approximately true. In the method of the present invention, the above assumption is not made but, as described above, separate scales are derived for each gamma curve and the concentration of the unknown element is related to an intensity which is a function of both scales, each of which is correct for and only for the specific line measured upon it.

It has been found that the principle of this invention may be advantageously utilized by setting up a working curve wherein the concentration of the unknown is related to the ratio of the intensity of the unknown to an intensity which is a function of the intensity of two lines of the internal standard. Under this procedure, gamma curves are developed as previously described for two lines of the internal standard and for the unknown line. As before, these curves are projected on their intensity axes to derive independent logarithmic scales. These scales may then be used in the form of a computer as will be hereinafter described which sets up, as a ratio, the intensity of the unknown line to the intensity of a line which is an artificial homologue derived by computation from the intensities of two internal standard lines having different excitation potentials. A working curve is then set up relating the concentration of the unknown to the aforementioned ratio using, as above, standard samples having the unknown element present in known and varying amounts. A scale, as shown in Fig. 7 and described in connection therewith is also set up to compensate for day to day variables in photographic procedure. This operation differs from the prior art in these respects: all previous methods have relied on the ratio of the unknown to a single standard line intensity; ratios of lines of the same element having different potentials have been used as a means to check constancy of the electrical conditions of a discharge, but for no other purpose. This invention extends the use of that ratio; prior art makes no effort to compensate for excitation variables as they do occur but tries to select lines so these effects are minimized. This invention compensates for the variables in excitation which are not compensated in previously existing devices.

Figure 8:
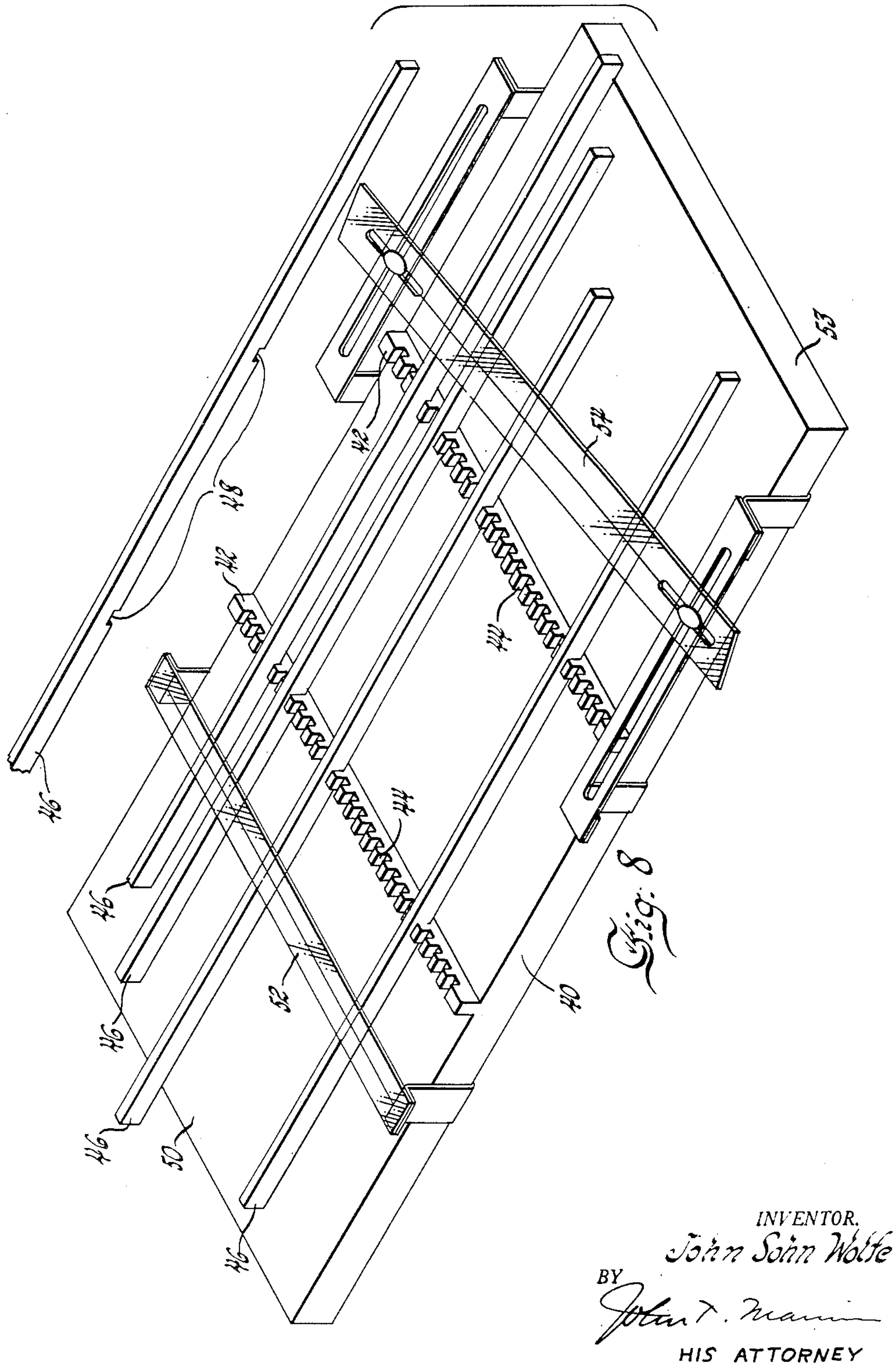
Figs. 8, 9 and 10 show one form of other apparatus which may be used in carrying out this invention.
Figure 9:
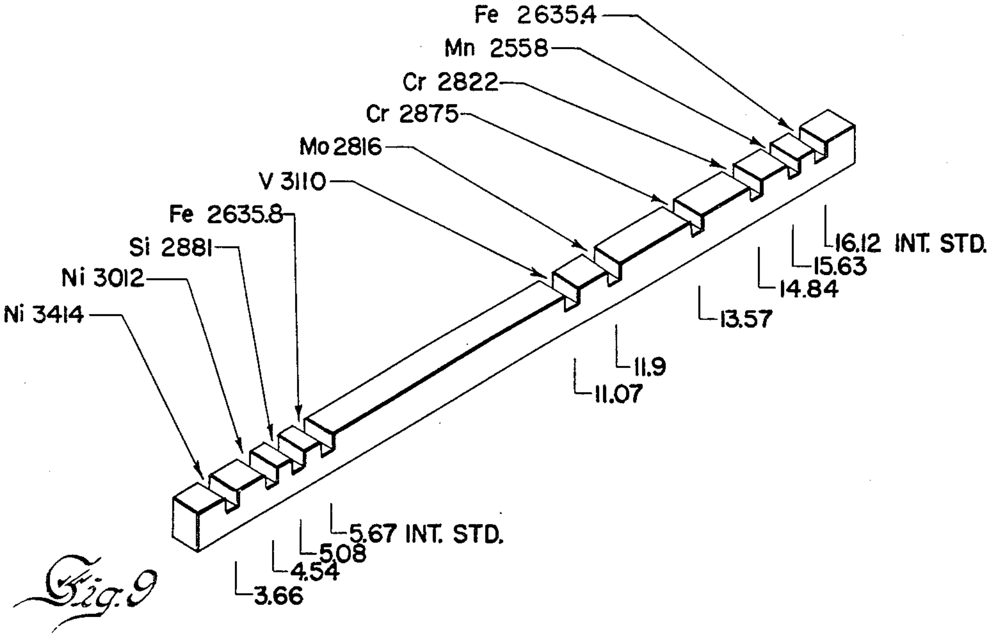
Figure 10:
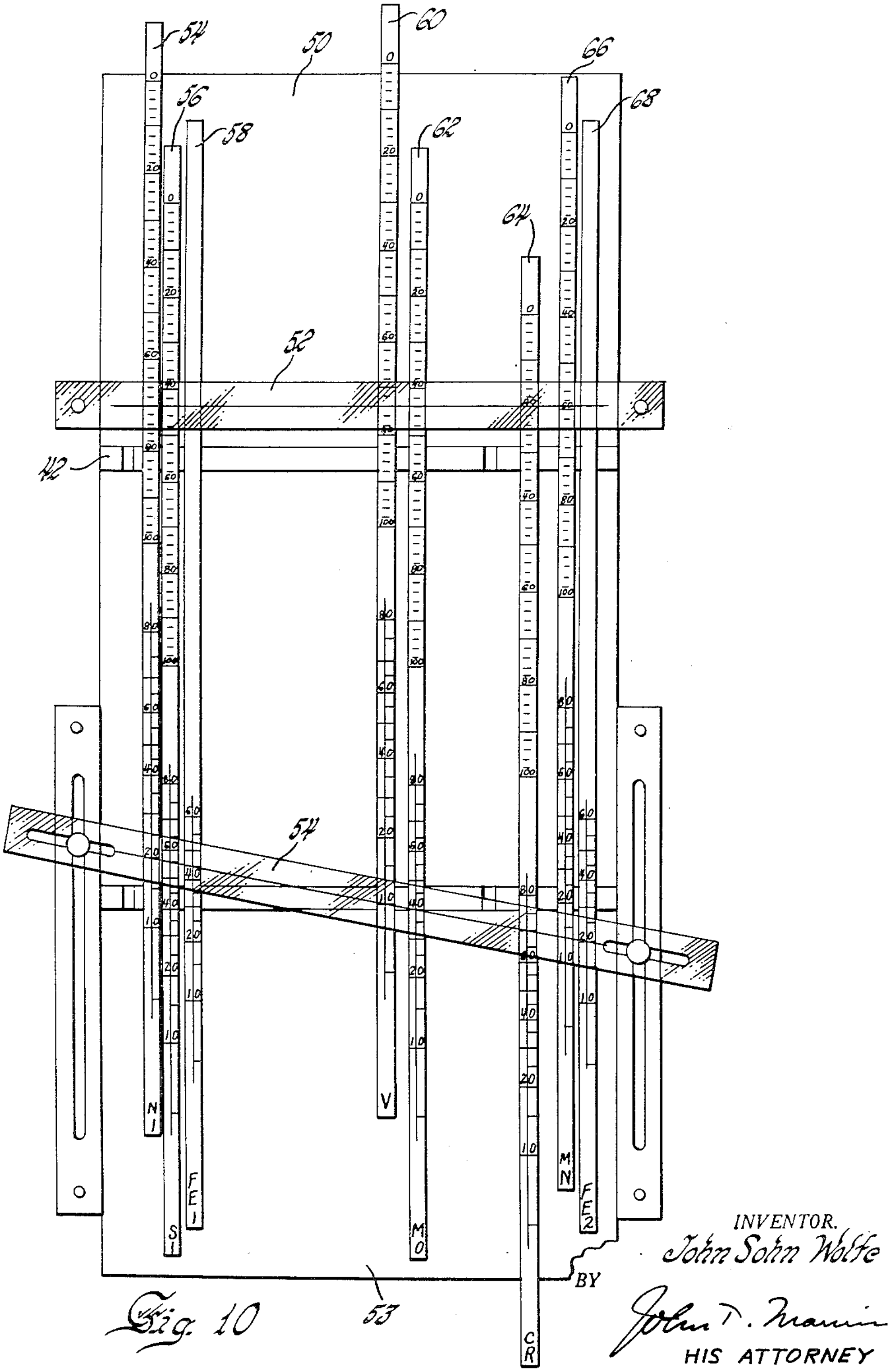

An example of the computing device which may be used to carry out the present invention is shown in Figs. 8, 9 and 10. Referring to Fig. 8, a base of suitable dimensions 40 is provided with at least two spaced transversely positioned elongated members 42 which are provided with a plurality of spaced notches as at 44 along their lengths for supporting a plurality of elongated scale carrying members 46. The notches 44 are so arranged that the scale carrying members 46, when supported by the notches, will be disposed in a coplanar and parallel relation to each other and longitudinally slidable with respect to each other. The scale carrying members 46 are spaced from each other in accordance with the respective initial excitation energies of the respective transitions in accordance with the rule hereinafter stated. Two of the scale carrying members 46 are provided with undercut notches 48 which engage the notches 44 and cause such scale carrying members to rest in a fixed position. Near one end 50 of the base 40 there is provided a fixed index line 52 mounted on any suitable transparent material at a right angle to and over scale carrying members 46. The exact position of the index line 52 relative to scale carrying members 46 will be hereinafter indicated. The other end 53 of base 40 is provided with a similar index line 54 which is mounted over members 46 so as to allow both a translation and an angular setting with respect to scale carrying members 46 as shown.

Reference is made now to Fig. 10 which is a top view of a device similar to that shown in Fig. 8 and which shows example scales mounted on the scale carrying members. This particular computing device is set up to have two scale members 58 and 68 fixed in a manner described above and a number of movable scale members 54, 56, 60, 62, 64 and 66. The lower end 53 portions of each scale member have positioned thereon scales which are derived from gamma curves such as 10 and 12 of Fig. 3 for various element lines. As shown in Fig. 10, fixed scale members 58 and 68 carry scales for two iron lines while scale members 54, 56, 60, 62, 64 and 66 carry scales for Ni, Si, V, Mo, Cr, and Mn, respectively. Fixed members 58 and 68 carry scales for the internal standard whereas the movable members carry scales for various unknowns. Each scale is derived so that, as in the case of Fig. 3, these scales have a given value 30 which represents for each scale the same linear distance from a point of reference. The movable scale members each carry on their upper or end 50 portions a linear scale similar to that of scale 18 of Fig. 3. Scale members 58 and 68 do not carry scales on their upper portions. The linear scales on the upper portions of the movable scales are so arranged that when the lower portions of all scales are aligned at 30, the index line 52 with coincide with number 50 on the linear scales. It will be seen that the device is a further development of the apparatus shown in Fig. 3 wherein an intensity which is a function of two lines of an internal standard is compared with the intensity of a line of an unknown element.

In order to set forth the relative lateral disposition of these scales which represent intensity functions of spectrum lines, it is necessary to consider the physical origin of the radiation which creates the lines.

When an atom is in a state of zero energy as respects the configuration of its planetary electron(s), it is unable to radiate. If such configuration is changed by the addition of energy, the energy so added can be radiated as light. The energy stored in an atom as a distortion of its planetary electron system is conventionally expressed in terms of a unit called the electron-volt which is equal to $1.601 \times 10^{-12}$ ergs and represents the energy acquired by an electron in falling through a potential difference of one volt. It is possible for an atom to radiate only from certain definite energy levels falling to certain other definite energy levels in accordance with known natural laws or transitions. The energy difference between the two levels is converted to radiation, and the wave length of the resultant radiation is inversely proportional to the numerical value in electron volts of this difference according to the formula $$\lambda(\epsilon\alpha-\epsilon\omega)=12,378$$

where $\lambda$ is wave length in Angstrom units and $\epsilon\alpha$ and $\epsilon\omega$ are, respectively, the initial and terminal electron volt energies of a transition. Thus, a spectrum line of wave length 6189 A. represents some transition involving a change of 2 electron-volts. The exact values for many spectrum lines have been determined and are listed in such publications as An Ultraviolet Multiplet Table, by C. E. Moore (Circular 488, Secs. 1 and 2, USDC, NBS) and A Multiplet Table of Astrophysical Interest, by C. E. Moore (Princeton University Observatory #20).

The operation of this computing device is based upon the fact that a quantitative relationship exists among the changes in unabsorbed spectrum line intensities emitted by an electrically excited source, and that the magnitude of these changes is a function of the $\epsilon\alpha$ term specific to each such transition. If, therefore, the values of $\epsilon\alpha$ for two lines of an internal standard element are known, in which the values are fairly divergent in magnitude, it is possible to predict from the variations in intensity of these two lines the variations in intensity of other spectrum lines having different values of $\epsilon\alpha$. The computer described in this application provides for the computation of "artificial" homologous lines having $\epsilon\alpha$ values determined by linear interpolation between the $\epsilon\alpha$ values of the internal standard lines or by linear extrapolation beyond their $\epsilon\alpha$ values, and for the use of these derived intensity values as comparison standards to compute the intensity ratios used to establish the working curves and determine the analytical results in accordance with the art as described in the application.

This interpolation and/or extrapolation is achieved in the computer by parallel spacing the respective scales with separations determined by the initial energy level in electron-volts of the transition represented by each such scale individually. Thus, in the examples shown in Figs. 9 and 10, the scales are spaced linearly according to the excitation voltages $\epsilon\alpha$ relating to the respective scales. Fig. 9 shows a scale supporting member 42 notched precisely to space scales for the following analytical scheme:

| Element | Wave length in A. | $\epsilon\alpha$ Value |
|---|---|---|
| Ni | 3414 | 3.66 |
| Ni | 3012 | 4.54 |
| Si | 2881 | 5.03 |
| Fe | 2635.8 | 5.67 |
| V | 3110 | 11.07 |
| Mo | 2816 | 11.9 |
| Cr | 2875 | 13.57 |
| Cr | 2822 | 14.84 |
| Mn | 2558 | 15.63 |
| Fe | 2635.4 | 16.12 |

The scale supporting members 42 may, of course, be notched at regular intervals along their entire lengths to accommodate scales for any analytical scheme, as is shown in Fig. 8.

In using the device, referring to the analytical scheme shown in Fig. 10, assume that it is desired to analyze an M*n* unknown contained in an iron matrix. Percent transmission values are read for two selected iron lines, preferably one atom line and one ion line, and for the M*n* line, the adjustable index line 54 is adjusted to intersect the percent transmission value on each of the internal standard lines represented by scales 58 and 68. The hair line 56, so set, becomes a homologue for a line at any excitation potential, and by sliding the scale representing the M*n* unknown till its observed percent transmission value is under the said hairline, the position of the upper hairline on the scale reads as a function of the log of the ratio of the M*n* unknown line to the computed homologous intensity. As previously indicated, the ratios so calculated are used in the same manner as the ratios in the example described in connection with Figs. 1 through 8.

It is seen that using the computer shown in Fig. 10, it is possible to analyze for several unknowns with a single determination of percent transmission values for the internal standard lines because the homologous line set up in the computation process is valid for all the unknowns. It should be understood that the apparatus described is only one form of the invention. It is obvious that various modifications may be constructed without departing from the basic principles of this invention.

While the embodiment of the present invention as herein disclosed, constitutes a preferred form, it is to be understood that other forms might be adopted.

What is claimed is as follows:

1. A method of quantitative spectrographic analysis comprising the following steps: producing light by subjecting a material to electrical excitation; producing an intensity graduated spectrum of said material including a spectrum line of the element to be analyzed and an internal standard element; evaluating a measurable function of photographic intensity of said intensity graduated spectrum lines recorded on a photographic plate in terms of the logarithm of the line intensity to obtain independent curves, projecting said curves on the log intensity axes to obtain scales, said scales being independent of each other but having equal linear distances representing equal logarithmic intensity increments; producing photographically recorded spectra of several standard materials containing the element to be analyzed and the internal standard element in known concentration and being similar in constitution to the material to be subsequently analyzed; measuring the ratio of the line of the element to be analyzed to the internal standard line by means of said independent scales; setting up a working curve relating said ratio to the concentration of the element to be analyzed; and determining like ratios in a like manner for at least two standard samples having the element to be analyzed present in known amounts and shifting said working curve to correspond to said latter ratios and concentration.

2. A method of quantitative spectrographic analysis comprising the following steps: producing light by subjecting material to electrical excitation; producing an intensity graduated spectrum of said material including a spectrum line of the element to be analyzed and two spectrum lines of an internal standard element; evaluating a measurable function of photographic intensity of said intensity graduated spectrum lines recorded on a photographic plate in terms of the logarithm of the line intensity to obtain independent curves; projecting said curves on the log intensity axes to obtain scales, said scales being independent of each other but having equal linear distances representing equal logarithmic intensity increments; producing photographically recorded spectra of several standard materials containing the element to be analyzed and the internal standard element in known concentrations and being similar in constitution and form to the sample to be subsequently analyzed; measuring the ratio of the line of the element to be analyzed to an artificial homologous line which is a function of the two said lines of the internal standard element by means of said independent scales; setting up a working curve relating said ratios to the concentrations of the element to be analyzed; determining like ratios in a like manner for at least two standard samples having the element to be analyzed present in known amounts and shifting said working curve to correspond to said latter ratios and concentrations.

3. A computing device for use in spectrograph analysis comprising a first scale derived by projection on the log intensity axes of a curve obtained by relating a measurable function of photographic image intensity of an intensity graduated spectrum line recorded on a photographic plate of an element to the logarithm of the line intensity, a second scale derived in a like manner for another element, said first and second scales being movable with respect to one another, a third scale calibrated in linear increments, an index marker associated with and being relatively movable with respect to said third scale, said third scale being associated with said first scale whereby a relative movement of said first and second scales causes a proportional movement of said third scale with respect to said index marker.

4. A computing device for use in spectrographic anlysis comprising at least two relatively movable scales, the first of said scales being derived by projection on the log intensity axes of a curve obtained by relating a measurable function of photographic image intensity of an intensity graduated spectrum line recorded on a photographic plate of an element to the logarithm of the line intensity, the second said scale being derived in a like manner for another element, a linearly calibrated scale associated with the first of said movable scales in a manner such that a movement of said first scale produces corresponding linear movement of said linearly calibrated scale, and an index marker associated with and in movable relationship to said linearly calibrated scale such that a relative displacement of said movable scales causes an index marker to indicate said displacement on the said linearly calibrated scale.

5. A computing device for use in spectrographic anlysis comprising a first scale derived by projection on the log intensity axes of a curve obtained by relating a measurable function of photographic image intensity of an intensity graduated spectrum line recorded on a photographic plate of an element to the logarithm of the line intensity, a second scale derived in a like manner for another element, a third scale calibrated in linear increments, said first and second scales being relatively movable, said third scale being movable with respect to at least one of said first and second scales and disposed so that a movement of the first and second scale produces a proportional linear movement of said third scale and an index marker associated with said first scale in a manner such that said marker indicates proportional displacement on said third scale corresponding to a relative displacement of said first and second scales.

6. A computing device for use in spectrographic analysis comprising at least two relatively movable scales, the first of said scales being derived by projection on the log intensity axes of a curve obtained by relating the percent transmission of the image of an intensity graduated spectrum line recorded on a photographic plate of an element to be analyzed to the logarithm of the light intensity, the second said scale being derived in a like manner for an internal standard element, a linearly calibrated scale disposed in a fixed relationship to said first movable scale and an index marker associated with and in movable relation to said linearly calibrated scale such that a relative displacement of said movable scales is indicated on said linearly calibrated scale by said index marker.

7. A computing device for use in spectrographic analysis comprising at least two relatively movable longitudinal members, the first of said members having portion graduated longitudinally thereof to form a scale which is derived by projection on the log intensity axes of a curve obtained by relating any measurable function of the photographic image intensity of an intensity graduated spectrum line recorded on a photographic plate of an element to the logarithm of the light intensity, the second of said movable members having a like portion graduated longitudinally thereof to form a scale for another element which is derived in a like manner as the scale of the first movable member, said first movable members having another portion graduated longitudinally thereof in linear increments, and an index marker fixed on said movable member opposite the linear scale of said first movable member so that a relative displacement of the two said movable members will cause the index marker to indicate said relative displacement on said linearly calibrated scale.

8. A computing device for use in spectrographic analysis comprising at least two relative movable longitudinal members, the first of said movable members having a portion graduated longitudinally thereof to form a scale which is derived by projection on the log intensity axes of a curve obtained by relating the percent transmission of the image of an intensity graduated spectrum line recorded on a photographic plate of an element to be analyzed to the logarithm of the light intensity, the second said movable member having portions graduated longitudinally thereof to form a scale for an internal standard element which is derived in a like manner as the scale of said first movable member, said first movable member having another portion graduated longitudinally thereof in linear increments, and an index marker associated with said movable member so that a relative displacement of said movable members will cause the said index marker to indicate the amount of said relative displacement on said linearly graduated scale.

9. A computing device for use in spectrographic analysis comprising a base for holding longitudinal members in a parallel and spaced relation to each other and having ends, two longitudinal members disposed in fixed relationship to said base and in parallel relationship to each other having first end portions graduated to form independent scales which are derived by projecting on the log intensity axes of two curves obtained by relating a measurable function of photographic image intensity of two intensity graduated spectrum lines recorded on a photographic plate of an internal standard element to the logarithm of the light intensity, a longitudinal member disposed on said base in a longitudinally movable relation to and in parallel relation to said fixed members, said movable member having said first end portion graduated to form an independent scale which is derived for an element to be analyzed in a like manner as the said scales of said internal standard element, said movable member having the second end portion graduated in linear increments, a hairline index fixed with respect to said longitudinal members and extending across said second end portions thereof and at right angles thereto, and a hairline marker extending across the scales of said first end portions of said longitudinal members, said first end marker being movable angularly and longitudinally with respect to said longitudinal members, said longitudinal members being spaced in a linear relation according to the excitation potential of the elements which the said first end scales represent.

10. A computing device for use in spectrographic analysis comprising two scales disposed in a fixed, parallel and spaced relation to each other, said fixed scales being derived by projecting on the log intensity axes of two curves obtained by relating a measurable function of photographic image intensity of two intensity graduated spectrum lines recorded on a photographic plate of an internal standard element to the logarithm of the line intensity, a plurality of scales disposed in a relatively movable, parallel and spaced relaiton to each other and to said fixed scales and being derived for elements to be analyzed in a like manner as the said scales of said internal standard element, a linearly calibrated scale associated with each of said relatively movable scales in a manner such that a movement of said movable scale produces a proportional linear movement of its corresponding linear scale, an index marker associated with said linear scales in a manner such that the said marker indicates a proportional displacement on said linear scales corresponding to a relative displacement of said two fixed scales and said movable scale, a marker extending across said fixed scales and being movable angularly and longitudinally thereto, said movable and fixed scales being spaced in a linear relation according to the excitation potential of the elements which said scales represent.

11. A method of quantitative spectrographic analysis comprising the following steps: producing light by subjecting a material to electrical excitation; producing an intensity graduated spectrum of said material including a spectrum line of the element to be analyzed and an internal standard element; calibrating scales in any measurable function of photographic image intensity for said spectrum lines, said scales being independent of each other but having equal linear distances representing equal logarithmic intensity increments; producing photographically recorded spectra of several standard materials containing the element to be analyzed and the internal standard element in known concentration and being similar in constitution to the material to be subsequently analyzed; measuring the ratio of the line of the element to be analyzed to the internal standard line by means of said independent scales; and setting up a working curve relating said ratio to the concentration of the element to be analyzed.

12. A method of quantitative spectrographic analysis comprising the following steps: producing light by subjecting material to electrical excitation; producing an intensity graduated spectrum of said material including a spectrum line of the element to be analyzed and two spectrum lines of an internal standard element; calibrating scales in any measurable function of photographic image intensity for said spectrum lines, said scales being independent of each other but having equal linear distances representing equal logarithmic intensity increments; producing photographically recorded spectra of several standard materials containing the element to be analyzed and the internal standard element in known concentrations and being similar in constitution and form to the sample to be subsequently analyzed; measuring the ratio of the line of the element to be analyzed to an artificial homologous line which is a function of the two said lines of the internal standard element by means of said independent scales; and setting up a working curve relating said ratio to the concentrations of the element to be analyzed.

13. A computing device for use in spectrograph analysis comprising a first scale calibrated in any measurable function of photographic image intensity for a spectrum line of an element, a second scale calibrated in a like manner for another element, said first and second scales being movable with respect to one another, a third scale calibrated in linear increments, an index marker associated with and being relatively movable with respect to said third scale, said third scale being associated with said first scale whereby a relative movement of said first and second scales causes a proportional movement of said third scale with respect to said index marker.

14. A computing device for use in spectrographic analysis comprising two scales disposed in a fixed, parallel and spaced relation to each other, said fixed scales being calibrated in any measurable function of photographic image intensity for two spectrum lines of an internal standard element, a plurality of scales disposed in a relatively movable, parallel and spaced relation to each other and to said fixed scales and being derived for elements to be analyzed in a like manner as the said scales of said internal standard element, a linearly calibrated scale associated with each of said relatively movable scales in a manner such that a movement of said movable scale produces a proportional linear movement of its corresponding linear scale, an index marker associated with said linear scales in a manner such that the said marker indicates a proportional displacement on said linear scales corresponding to a relative displacement of said two fixed scales and said movable scale, a marker extending across said fixed scales and being movable angularly and longitudinally thereto, said movable and fixed scales being spaced in a linear relation according to the excitation potential of the elements which said scales represent.

15. A method of quantitative spectroscopic analysis comprising the following steps: producing light by subjecting a material to electrical excitation, producing an intensity graduated spectrum of said material and including a spectrum line of the element to be analyzed and an internal standard element; evaluating a measurable function of the photographic image intensity for each of said spectrum lines in terms of logarithmic functions, said logarithmic functions being independent of each other; producing photographically spectra of several standard materials containing the element to be analyzed and the internal standard element in known concentration and being similar in constitution to the material to be subsequently analyzed; measuring the ratio of the element to be analyzed to the internal standard line by means of said independent logarithmic functions, and evaluating said ratio in terms of the concentration of the element to be analyzed.

16. A method of quantitative spectroscopic analysis comprising the following steps: producing light by subjecting material to electrical excitation; producing an intensity graduated spectrum of said material including a spectrum line of the element to be analyzed and two spectrum lines of an internal standard element; evaluating a measurable function of photographic image intensity for each of said spectrum lines in terms of logarithmic functions, said logarithmic functions being independent of each other; producing photographically recorded spectra of several standard materials containing the element to be analyzed and the internal standard element in known concentrations and being similar in concentration and form to the sample to be subsequently analyzed; measuring the ratio of a line of the element to be analyzed to an artificial homologous line which is a function of the two said lines of the internal standard element by means of said independent logarithmic functions; and evaluating said ratio in terms of the concentration of the element to be analyzed.

No references cited.